Sept. 26, 1950 O. KORNEI 2,523,576
RING-TYPE MAGNETIC RECORD-TRANSDUCING HEAD
Filed Aug. 2, 1946 4 Sheets-Sheet 1
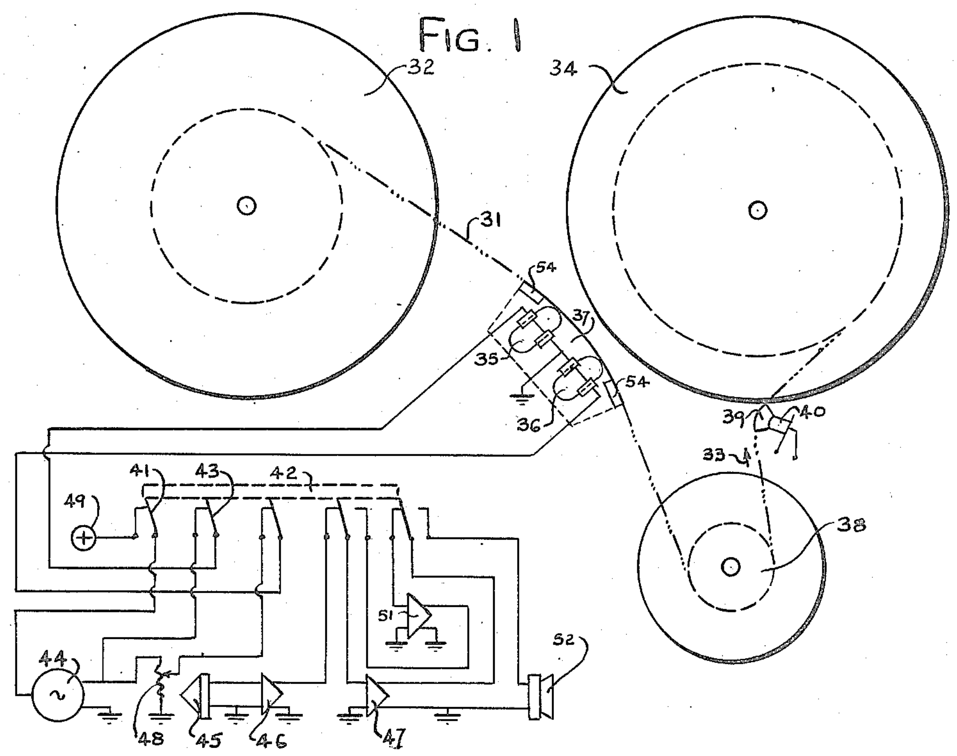
FIG. 1
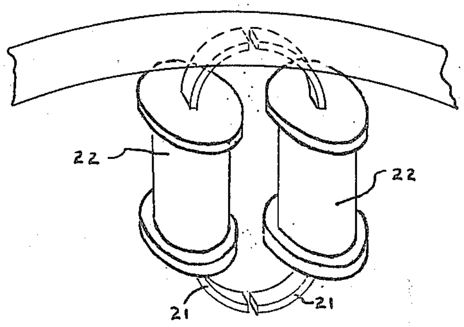
FIG. 1-A
INVENTOR
OTTO KORNEI
BY Pineles & Greene
ATTORNEYS.

INVENTOR
OTTO KORNEI
BY Pineles & Greene
ATTORNEYS

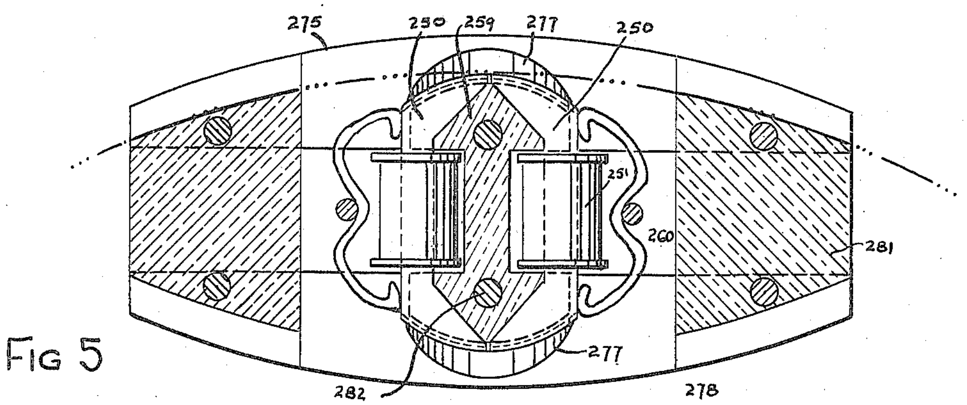
FIG 5
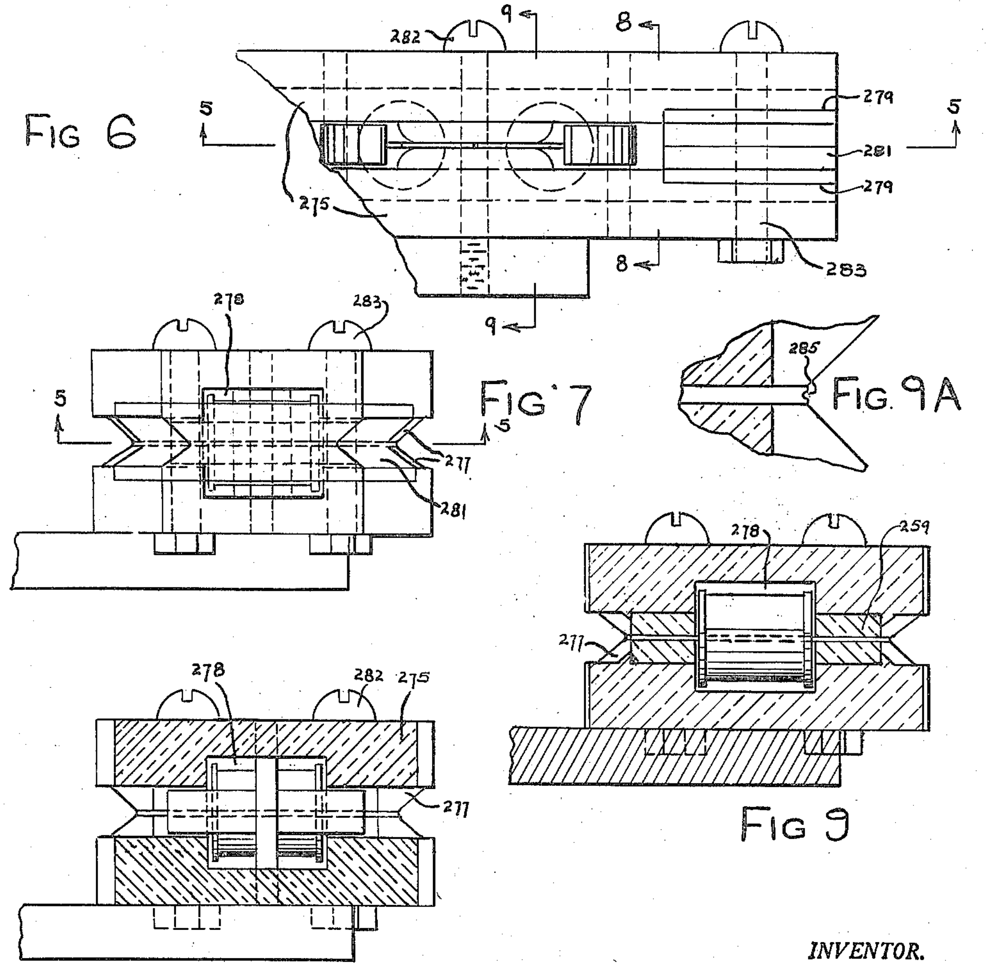
FIG 6, FIG 7, FIG 9A, FIG 9
FIG 8
INVENTOR.
OTTO KORNEI
BY *Pineles & Greene*
ATTORNEYS.

Sept. 26, 1950 O. KORNEI 2,523,576

RING-TYPE MAGNETIC RECORD-TRANSDUCING HEAD

Filed Aug. 2, 1946 4 Sheets-Sheet 4

INVENTOR
OTTO KORNEI
BY Pineles & Greene
ATTORNEY

Patented Sept. 26, 1950

2,523,576

UNITED STATES PATENT OFFICE 2,523,576

RING-TYPE MAGNETIC RECORD-TRANSDUCING HEAD

Otto Kornei, Cleveland Heights, Ohio

Application August 2, 1946, Serial No. 688,034

9 Claims. (Cl. 179—100.2)

This invention relates to magnetic record transducing heads of the type which are used in magnetic recording systems for recording magnetic signals or reproducing magnetically-recorded signals by magnetic flux interlinkage between relatively moving magnetic elements of a magnetic recording medium and windings of the magnetic transducer head which is used either for recording or for reproducing the signals or both.

A principal object of the present invention is to provide a magnetic record transducer head of relatively simple construction and capable of easy assembly from its component parts.

The foregoing and other objects of the invention will be best understood from the following description of exemplifications thereof, reference being had to the accompanying drawings wherein:

Fig. 1 is a diagrammatic view showing the principal elements of a magnetic recording and reproducing system equipped with a magnetic transducer head of the invention;

Fig. 1A is an enlarged view showing the principal elements of a magnetic transducing head;

Fig. 5 is a cross-sectional view of a modified form of transducer head, designed for cooperation with a recording medium in the form of a wire; in this view, the supporting and guide structure has been cut away along the line 5—5 of Figs. 6 and 7 to show the internal structure;

Fig. 6 is a side view of the modified transducer head of Fig. 5;

Fig. 7 is a front elevational view as seen from the right of the transducer head of Fig. 6;

Fig. 8 is a cross-sectional view along line 8—8 of Fig. 6;

Fig. 9 is a cross-sectional view along line 9—9 of Fig. 6;

Fig. 9A is an enlarged view of the pole-tip region of Fig. 9;

Figures 2, 3, 4:
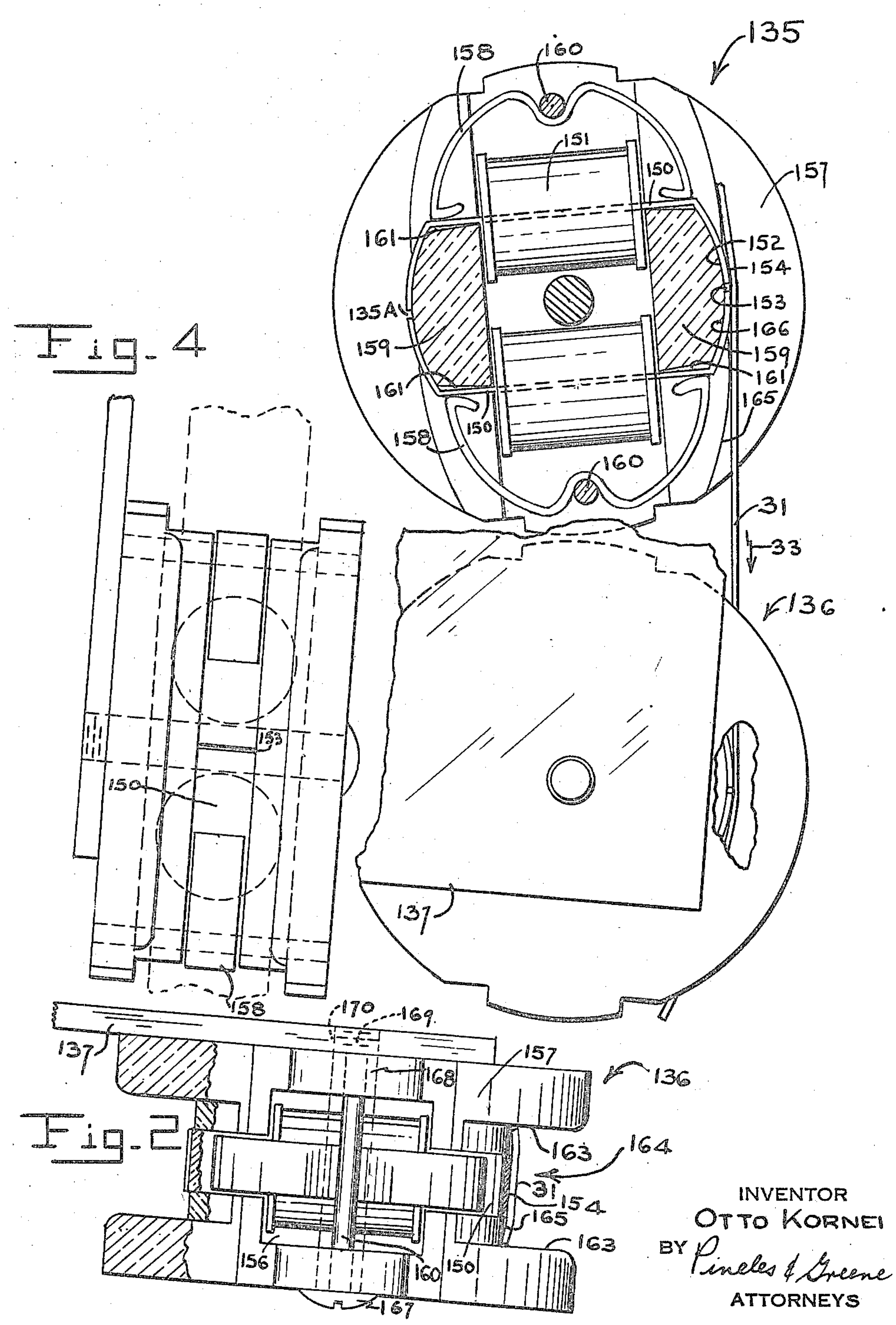
Fig. 2 is an enlarged partly cut-away view of a transducer head exemplifying the invention.
Fig. 3 is a top view partly in section of an assembly of two transducer heads of the invention mounted on a bracket plate and placed in operational alignment with a recording medium in the form of a tape.
Fig. 4 is a front elevational view of the assembly of Fig. 3 showing only one of the transducer heads of Fig. 3.

Fig. 1 illustrates in a simplified diagrammatic manner the principal elements of a magnetic recording system in connection with which the principles of the invention will be described. An elongated recording medium or record member, in the form of a flat tape 31, is shown impelled from reel 32 in the direction of the arrow 33 toward the reel 34. In moving from supply reel 32 toward reel 34, each element of the recording medium 31 passes in succession past the elements of a magnetic erasing or obliterating head 35, then past the elements of a magnetic record transducing head 36, which are shown mounted on a common bracket plate 37, then over the periphery of a pulley 38 combined with a fly wheel member, and therefrom over a guide surface portion 39 of a limit switch 40, before reaching to the take-up reel 34.

The two reels 32, 34 and the drive pulley 38 with its fly wheel form part of a reeling mechanism which makes it possible to move the tape past the transducer head 36 at a constant speed. Both in recording and reproducing, the recording medium 31 is guided past the magnetic record transducer head in the direction of the arrow 33, the reeling mechanism being provided with means for rewinding the recording medium on reel 32 before carrying on another recording operation or before each reproducing operation.

In recording, the recording and reproducing operations are carried out under the control of a multi-blade switch 42 which may be moved from the recording left-hand position shown, in which it establishes the recording circuits, to the opposite or right-hand position, in which it establishes the reproducing circuits. When the switch 42 is in the recording position shown, a source of high frequency oscillations 44 is connected to its power supply source indicated by the plus sign 49 through the switch blade 41, the circuit being completed by the ground connection shown. The windings of the obliterating head 35 are connected to the oscillator 44 by means of the blade 43.

The high frequency obliterating current supplied to the erasing head 35 is of sufficiently large amplitude so that each element of the moving magnetic tape passing through the obliterating head is subjected to decaying alternating magnetic flux sufficient to erase any previous magnetic signal record of the moving recording medium and restore the elements thereof to a magnetically neutral condition.

After being subjected to a magnetic erasing action by the erasing head 35, each element of the moving recording medium 31, upon reaching the record transducing head 36, is subjected thereby to a magnetic recording flux produced by amplified signal currents from a signal source, such as microphone 45, and a superimposed high frequency biasing flux component produced by a high frequency current component supplied by the oscillator 44. The electric signal currents are supplied to the transducer head 36 by way of the preliminary recording amplifier 46, main amplifier 47 and switch 42. The high frequency bias component conventionally used is supplied to the transducer head 36 from the oscillator 44 by way of the potentiometer 48 and the switch.

To reproduce a recorded signal while the recording medium moves from left to right in the direction of the arrow 33, the recording switch 42 is actuated to the left-hand reproducing or playback position. In this position, the oscillator 44 is disconnected from its power supply source 49, and no high frequency erasing and biasing currents are supplied to the erasing head 35 and transducer head 36. Furthermore, the windings of the transducer head 36 are disconnected from the recording circuit and connected instead to the reproducing circuit shown formed by the preliminary playback amplifier 51, the main amplifier 47, the output of which is now connected to a loudspeaker or an analogous reproducing device 52.

To improve the contact between the tape and the pole pieces biasing members such as felt pads may be mounted so as to press on the exposed face of the tape where it passes over the pole pieces and urge the tape into better and more uniform contact with them. When used such biasing members may be arranged to be lifted during the rewinding which is effected at a speed much higher than the recording and in which improved pole piece contact is not needed. Such lifting also simplifies the threading of the tape over the heads when mounting a fresh tape on the reel, for example.

The operation of the above apparatus is more completely described and explained in my copending application Serial No. 685,092, filed July 20, 1946, entitled Magnetic Recorder and Reproducer of which this application is in part a continuation.

Fig. 1A shows the essential elements of a magnetic transducer head 36 of the invention. The transducer head shown embodies a magnetic core structure formed of two like pole pieces 21 and transducer windings interlinked with the core shown as formed of two alike transducer winding coils 22, one coil for each pole piece unit. It is to be understood that essentially the same magnetic core structure and associated windings may be used either as a recording head or erasing head or reproducing head of a recording system of the type shown in Fig. 1. In some applications, a system of the type shown in Fig. 1 may be operated with a single transducer head structure formed of a core and winding for performing the recording, reproducing, and also the erasing operations, in which case the winding of the transducer head is connected to the source of erasing current during the rewinding operation for erasing the previous record while the wire is reeled back from reel 34 to reel 32. If a magnetic transducer head is intended for reproducing as well as for recording magnetic signals, the pole pieces 21 should preferably be made of a magnetic material of high magnetic permeability, such as Molybdenum Permalloy or Mumetal. If a magnetic transducer head is intended for erasing and/or for recording primarily the pole pieces 21 may be made of a magnetic material having not as high a permeability, silicon steel, for example. Although the pole pieces 21 are shown as being each made of a single lamination of magnetic material, they may be made of a plurality of laminae of magnetic and non-magnetic materials, for example, in order to produce greater mechanical strength than may be had in a pole piece made of a thin lamination alone. A backing strip of plastic material may, for example, be attached to a strip of Permalloy, thus forming a laminated pole piece. In general best results are obtained with the apparatus of the inventon when using magnetic pole pieces containing a minimum of magnetic material consistent with the requirement that the magnetic material should not approach too close to saturation during the recording operation. Sheet material having a thickness of the order of fourteen mils (.014 inch) has been found to produce very good pole pieces. Thinner pole pieces are also very good electrically but have mechanical inferiority and should be reenforced if necessary to avoid bending with its accompanying magnetic deterioration during assembly or use.

Figs. 2, 3 and 4 show the details of the magnetic structure of one form of a magnetic transducer head 136 of the invention. The erasing head 135 may be identical with the transducing head 136 and is so shown. Each head comprises a magnetic core structure shown formed of two like pole piece elements 150 and transducer windings shown formed of two like coils 151, one for each pole piece element. The two pole pieces 150 are shown formed of strips of highly permeable magnetic sheet metal having pole tip ends 152 separated by a non-magnetic gap 153, the pole tips 152 being bent so as to provide two convexly curved pole faces 154 longitudinally aligned on the opposite sides of the gap 153 and arranged so that a tensioned flexible recording medium, such as the tape 31, moving past the transducer head, will be flexed into engagement with the convex pole faces 154 to assure that positive stable contact conditions are maintained between the pole face portions 154 adjoining the gap 153 and the elements of the record track surface of the record member 31 moving past the same.

The two pole pieces are held in their operative position against the outer sides of the substantially rigid supporting and mounting members 159 between which is provided a recess or void 156 within which the winding coils 151 fit.

The two pole pieces 150 form a substantially closed magnetic circuit including, in addition to the working gap 153, a symmetrical non-magnetic gap 153A so that each core section is magnetically alike and symmetrical with respect to each other in order that they shall form two electromagnetically balanced structures which are symmetrical with respect to their two gaps, so that an external disturbing stray flux field traversing the two winding sections either in their axial direction, in a direction perpendicular thereto, or in any other direction will induce in the interconnected winding sections voltages which are substantially equal in magnitude and opposite in phase so that they cancel, although the interconnected windings are very efficient in reproducing signals recorded on a magnetic recording medium moving past one of its gaps or for making a new recording. Furthermore, any stray flux will directly induce a magnetic flux in the magnetic core in a symmetrical manner also, so that such disturbing induced flux likewise substantially cancels out.

The coils 151 may be wound around the pole pieces 150 by using a longitudinally split or slotted bobbin into which the bent pole pieces are first fitted since bending of the highly magnetic pole piece, such as is required to form the pole tip portions 152, must otherwise be followed by a high temperature annealing step to take advantage of the maximum degree of permeability of the highly permeable magnetic pole pieces.

The bobbin slots or sections may also be arcuately shaped in which case the pole pieces may also be arcuate and may be inserted into the bobbins after the bobbins are wound.

The pole pieces having their windings mounted are assembled onto a supporting and guide structure 157 and retained by means of the curved leaf springs 158 which press the pole pieces 150 firmly against the outer surfaces of the supporting and separating members 159, the springs 158 being retained or held from moving outward by the cooperating pin members 160 which are rigidly affixed to the supporting and guide structure 157. The supporting and separating members 159 are tapered so that a wedge-shaped void or clearance 161 is provided between the inner faces of the pole pieces 150 and the outer surfaces of the supporting and separating members 159 so that the pole pieces 150 are free to flex to a very limited extent under the action of the force, provided by the springs 158, which tends to press the pole pieces 150 against the outer surfaces of the supporting and separating members 159.

Although the magnetic properties of the pole pieces which are made of high permeability materials may be impaired by subjecting such materials to mechanical stress, the small wedge-shaped clearance 161 provides for so small a degree of strain in the pole pieces 150 when acted on by the springs 158 as to be within the elastic limit and the magnetic properties of the pole pieces are not seriously affected. At the same time, the pole pieces are sufficiently free to flex so that they may conform with and fit stably against the outer surfaces of the supporting and separating members 159. If desired the springs 158 may be replaced by other resilient retaining devices, such as "U-shaped" members having pads of rubber or other elastomer affixed to the ends of the U, so as to resiliently retain pole pieces 150 in place.

As shown in Fig. 2, the supporting and guide structure 157 is provided with side wall elements 163 which provide a guide for the moving magnetic record tape 31. The magnetic record tape is guided in its motion past the magnetic elements of the transducer head 136 by the channel 164, the two sides of which are formed by the side wall elements 163 of the supporting and guide structure 157, and the bottom of which is formed by the guide surfaces 165 of the said supporting and guide structure and the upper surfaces 154 of the pole pieces. The supporting and guide structure 157 is provided with a recess or groove 166 into which the pole pieces 150 fit. The depth of the recess 166 varies from approximately zero at the gap 153 to substantially more than the thickness of the pole pieces at the site of the wedge-shaped clearance 161. In the figures the depth of the recess has been exaggerated in the interest of clarity. When said pole pieces are properly disposed in said recess, the upper surfaces 154 of the pole pieces gradually emerge beyond the surfaces 165 of the supporting and guide structure, thus providing a small amount of extra tension holding the tape firmly and in constant magnetic disposition against the non-magnetic gap and adjacent pole portions as well as providing a smooth surface over which the magnetic record tape moves.

The transducer head 136 and erasing head 135 are attached to the bracket plate 137 by means of the bolts 167 which pass through the holes 168 in the supporting and guide structure, and which have a threaded portion 169 which engages with a cooperating threaded hole 170 in the bracket plate.

The supporting and guide structure is a single piece which may be formed by a suitable casting or molding process from a material such as a phenolic resin.

In accordance with one phase of the invention, I have found that when using a magnetic recording medium about one micron in size or less, formed of powder particles of permanently magnetizable material, such as iron oxides, bonded together by a bonding compound, a materially better overall frequency reponse of the magnetic recording and playback process may be obtained by making the magnetic record transducer head so that the non-magnetic gap separating the pole face region of the pole pieces shall be only about fifteen times the size of the magnetic powder particles or less, or, in general, of the order of fifteen microns or less.

In particular, I have found that a magnetic record transducer head having such small non-magnetic gap separating the pole face regions of the magnetic pole pieces may be provided by placing the edges of the pole pieces facing the gap, such as the gap 153 of the transducer head shown in Figs. 2 to 4, in direct physical contact. In order to make it possible to produce magnetic record transducer heads, the pole piece ends of which are in physical contact so as to form therebetween a non-magnetic gap of a width of the order of fifteen microns or less, the edges of the pole pieces facing each other on the opposite sides of the gap 153 are polished and given a very fine finish so that when they are pressed together along their fine polished surfaces, they form a magnetic discontinuity which is effective as a non-magnetic gap of the order of about fifteen microns or less. Such construction of a magnetic record transducer head provided with such small gap is based on the recognition of the fact that when two plane surfaces of magnetically permeable material are placed in direct physical contact, the magnetic reluctance of the contact junction between the two plane surfaces cannot be reduced to zero. This phenomenon is caused by the fact that each plane contact surface, though polished, inherently exhibits a certain degree of microscopic roughness, and that such surfaces are usually covered by an extremely thin film of oxide and absorbed gases so that when they are pressed into contact engagement, the junction region between such magnetic contact surface exhibits characteristics of a non-magnetic gap of a width of the order of several microns, such as about ten to fifteen microns. Such gap spacing is also highly satisfactory for recording or reproducing and erasing from a homogeneous metal tape as well as the dispersed magnetic powder-containing tape.

Figs. 5 through 9 show a magnetic transducer head exemplifying the invention and which differs from the magnetic transducer head described in connection with Figs. 2 to 4 in that it is adapted for use with a magnetic record medium in the form of a thin filament or wire.

In this construction there is shown a symmetrical magnetic structure comprising the two thin flat pole pieces 250 with their interlinked transducer windings in the form of the two like coils 251. Two pole pieces 250 are mounted on a supporting structure 259 which is slotted around its periphery to receive the major portions of the pole pieces 250. The supporting member 259 is also provided with hollows 260 which accommodate the coils 251. The supporting member with its pole pieces 250 so mounted is then placed between a pair of side plates 275, each containing a pair of projections 277. The outer portion of each projection is rounded and serves as a guide for the filamentary record track, and the inner portion of each projection has a flat surface parallel to the extended flat surface of the pole pieces and helps to support them. The side plates are also grooved, as indicated at 278, to receive the coils 251 and also grooved at 279 to receive additional guides 281 over which the record track is guided toward and from the pole pieces. The pole piece, coil and supporting structure assembly is then fastened in place between the end walls 275 by means of the screws 282. Leaf springs 258 are inserted and supported against pins 260 and urge the pole pieces 250 toward each other and maintain them in their proper position. The screws 282 may also be used to fasten the entire assembly to the bracket plate 137. The guides 281 are held in place between the walls of the grooves 279 by means of the screws 283. The guides 281 should be made of very hard and wear-resistant material, such as porcelain or metal, and are shown as provided with V-shaped grooves to properly align the filamentary record track. The outer portions of the projections 277 define walls of a V-shaped passageway which also guides the record track along the thin edge faces of the pole pieces 250.

During use, the moving record track will wear grooves 285 in the pole pieces 250 in the region of the gap 253. To diminish any change by the grooving action in magnetic linkage between the magnetic track and the non-magnetic gap as well as the pole pieces, the pole pieces may be preliminarily grooved in the edge face regions adjoining the gap so as to provide a larger contact area between the filament and the pole pieces. This not only diminishes erosion of the pole pieces, but decreases the effect of further erosion on the magnetic linkage.

The supporting structure 259 provides a rigid and inflexible support backing the pole-tip regions of the pole pieces and permits the use of thin highly efficient pole pieces while avoiding resiliency or yieldability such as would cause flexing of the pole-tip regions or movement of the entire pole-tip assembly during each use, appreciable pressures between the magnetic track and pole pieces being normally developed.

Figure 10:
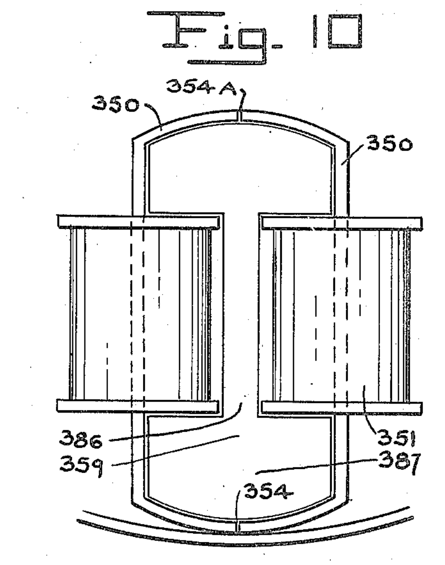
Figs. 10 and 11 are views of modified transducing heads according to the invention, adapted for use with magnetic tapes.
Figure 11:
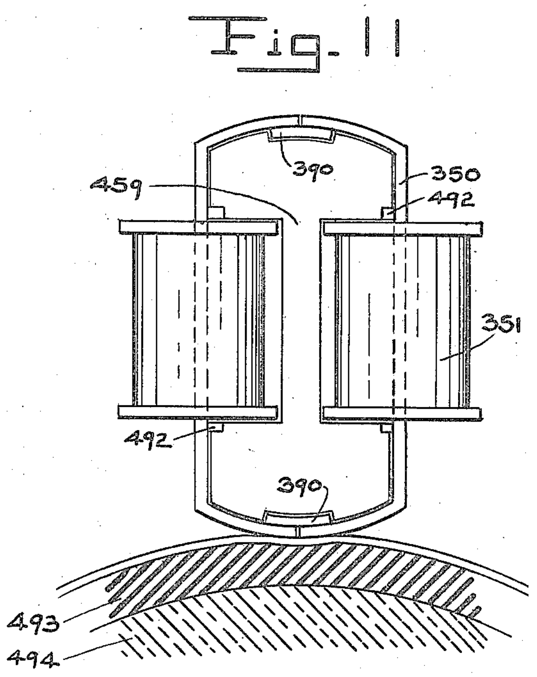

Figs. 10 and 11 show further modified transducer head assemblies for use with magnetic tapes. Referring to Fig. 10, there is shown a magnetic core structure having two like pole pieces 350 generally C-shaped and made of thin sheet metal. The gaps 354 and 354A are very small, as indicated above, and are formed by mounting the pole pieces on a supporting structure 359 which is a unitary relatively inflexible member having an intermediate portion 386 and two wider end portions 387. The supporting structure may be made from any stiff materials, such as molded plastics, resin impregnated textiles, or porcelain. The pole pieces 350 are fastened to the supporting structure 359 at its wider portions 387, in the manner shown, by cementing the ends of the pole pieces 350, properly positioned adjacent each other. Any stable cement, such as a resinous cement, may be used.

According to the invention, the pole pieces 350 may also be secured in place and properly positioned on the supporting structure 459, as shown in Fig. 11, by first securing their ends to short metallic members 390 so that the members 390 are placed internally of the core and span the gaps between the pole pieces 350. The metal members 390 should be non-magnetic and may be selected of low conductive metal to diminish any current losses. The pole pieces 350 may be fastened to these members 390 by cementing or spot welding, it having been determined that the passage of current and heating of the pole piece ends during spot welding has very little effect on the magnetic properties of the core. Soldering may also be used for fastening. It is understood, of course, that before the pole pieces are fastened to the supporting structure the coils 351 are mounted in place on the pole pieces. The entire double pole-piece and coil assembly with the members 390 holding the individual pole piece units together may now be slipped over the supporting structure from one of its side faces. This mounting step may be facilitated by tapering the periphery faces of the supporting structure 459, or by providing 459 with cut-out portions 492, as shown. These cut-out portions 492 provide enough clearance so that a tightly fitting double pole-piece assembly can readily be slipped on after which spacers are inserted in the cut-out portions 492 to take up the clearance and securely hold the entire assembly together on the supporting structure. This mounting may be further secured by cementing as described in connection with Fig. 10. The extreme ends of the supporting structure 459 of the construction of Fig. 11 are also shaped to receive the members 390. If desired, the supporting structure 459 may be molded with the metallic inserts 390 in place. Each pole piece unit is then spot welded or soldered in its proper position.

Fig. 11 further shows a modified technique for pressing the magnetic record tape against the gap region of the magnetic core. A resilient backing member 493 is mounted on a rigid base 494. The transducer head is positioned directly over the resilient member 493, as shown, and the magnetic record tape which may be of the limp type, more fully described in my application referred to above, is led between the head and the resilient member 493 which in deforming to accommodate the thickness of the tape firmly presses it against the pole region of the transducer head. Such an arrangement is especially suitable for transducer units using thin disc-like magnetic record members after the fashion of disc records, the transducer head being mounted on a pivoted arm and weighted to establish the firm contact with the record track, means being also provided to guide the head in a spiral path around the magnetic record disc.

As another variation according to the invention, the resilient member may be incorporated in the magnetic record track either as the magnetic layer or in a supporting layer.

The supporting structures 359 and 459 may be made wider than the pole pieces after the manner shown in Fig. 4. It is usually desirable to employ only the central portions of the limp non-homogeneous record tape of the type described in my above mentioned application since these tapes are generally made in very wide rolls which are cut into the narrow widths used, and such cutting has a deleterious effect on the magnetic qualities of the edges of the tape.

Furthermore, when using a separate erasing head, as in Fig. 1, it may also be desirable to make the transducing head slightly narrower than the erasing head so as to insure the recording on a magnetically neutral portion of the tape. The extra width of the supporting structure projects beyond the width of the magnetic core and may be used to support the edge portions of the tape and help maintain substantially constant magnetic linkage between the tape and the pole regions of the magnetic core.

Figure 12:
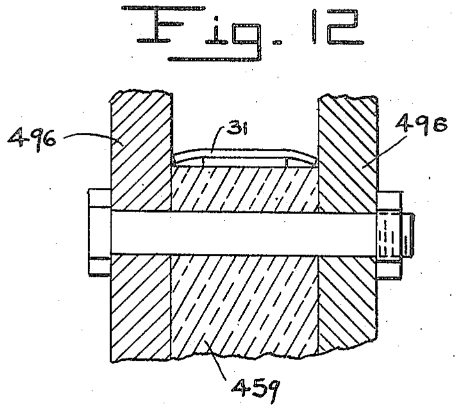
Fig. 12 is a cross-sectional view of a transducer head using separable side walls.

Guiding surfaces may be used with the constructions of Fig. 10 or 11 to insure the proper aligning of the record track. Fig. 12 shows such a construction in which separate side members 496 are fastened to the supporting structure 359.

Figure 13:
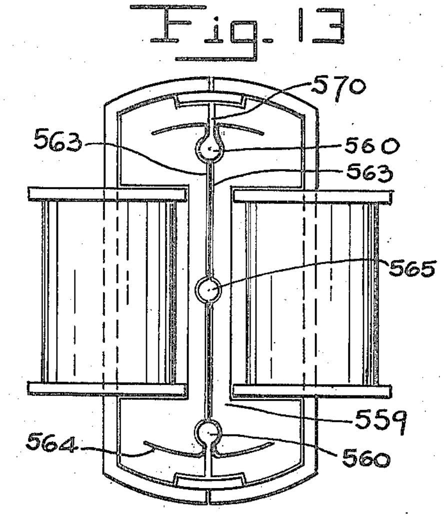
Fig. 13 is a view of a further modified transducing head intended for use with a record track in the form of tape.

In Fig. 13 there is illustrated a modified head construction according to the invention. This construction is generally similar to that of Fig. 11, differing in that the supporting structure 559 shown in Fig. 13 is adapted to receive expanding spacers in only two openings 560 formed between two inserts 563, which may be molded in place. The inserts 563 are illustrated as each having end portions 564 embedded deeply in half of the supporting structure and having a concave intermediate portion 565, as well as two other concavities that form the openings 560. The inserts 563 are secured together, as by welding or soldering, so as to provide a unitary construction. If desired, the supporting structure halves may be made integral around one or both sides of both inserts 563 so as to provide a single mounting unit. The inserts should be spring members, such as spring steel, if the remainder of the supporting structure does not have the desired resiliency. If the inserts 563 are sturdy enough, the intermediate portions of the contacting supporting structure halves may be omitted to make a simpler construction, in which the inserts are secured together along intermediate portions, as at 565, and the remaining structure consists of four portions each surrounding one end 564 of each insert. Each such portion forms a backing support for a pole portion of a pole piece, and all portions cooperate to provide a unitary member on which the fragile double pole-piece assembly is easily mounted and affixed by spacers inserted in the openings 560 which cause the unitary member to spread in the regions 570 to snugly hold the entire assembly together.

The expression "magnetic record transducing" as used herein in the specification and claims is intended to mean either the operation of magnetically recording signals on a magnetic recording medium, or the operation of reproducing magnetically recorded signals, or the operation of erasing magnetically recorded signals, or any combination of two or more of these operations.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

I claim:

1. In a magnetic record transducing head for transducing signals by magnetic flux interlinkage between record transducer windings and successive elements of a relatively moving elongated permanently magnetizable record track: a strip-like single-thickness of magnetic sheet material forming a substantially closed magnetic core loop including two substantially alike core strips having pole portions terminating in substantially parallel pole-tip edges bordering the opposite sides of a non-magnetic gap; the width of said core strips extending transverse to the plane of the loop, and the outer surfaces of the pole portions extending from the opposite sides of said gap being shaped to constitute a substantially continuous outwardly-convex guide path of substantial length for guiding said record track along said guide path past said gap, each core strip having an intermediate strip region upon which part of the windings is mounted, and two pole portions extending laterally from opposite portions and to one side of the intermediate region; a supporting structure having a unitary member with two opposite mounting sides on which the two core strips are held mounted in their operative position, the unitary member of said supporting structure having outwardly projecting support faces receiving the pole portions and extending from one pair of the opposing pole portions to the other pair for rigidly holding the pole portions inflexibly in place and forming a stable support for the magnetic core loop, and means holding the magnetic core strips on the supporting structure.

2. A magnetic record transducing apparatus as defined by claim 1 in which the supporting structure also has guide portions extending on both sides of at least one of the pole face receiving portions to a distance sufficient to guide the relatively moving magnetic record track as it approaches and leaves the non-magnetic gap between the pole faces.

3. A magnetic record transducing apparatus as defined by claim 1 in which the supporting structure also has guide portions extending on both sides of at least one of the pole face receiving portions to a distance sufficient to guide the relatively moving magnetic record track as it approaches and leaves the non-magnetic gap between the pole faces, and in which the pole face receiving projection and the pole portions are convexly shaped so as to cause the record track to move in a path that is convex at the pole portions providing more positive contact between the record track and the pole portions.

4. A magnetic record transducing apparatus as defined by claim 1 wherein the supporting structure has an opening receiving the transducing windings on the magnetic core portions, the walls of the opening supporting the windings.

5. A magnetic record transducing apparatus as defined by claim 1 in which the magnetic core portions are sheet metal having a thickness of the order of fourteen mils or less.

6. In a magnetic record transducing head for transducing signals by magnetic flux interlinkage between record transducer windings and successive elements of a relatively moving elongated permanently magnetizable record tape: a striplike single-thickness of magnetic sheet material forming a substantially closed magnetic core loop including two substantially alike core strips having pole portions terminating in substantially parallel pole-tip edges bordering the opposite sides of a non-magnetic gap; the width of said core strips extending transverse to the plane of the loop, and the outer surfaces of the pole portions extending from the opposite sides of said gap being shaped to constitute a substantially continuous outwardly-convex guide path of substantial length for guiding said record tape along said guide path past said gap, each core strip having an intermediate strip region upon which part of the windings is mounted, and two pole portions extending laterally from opposite portions and to one side of the intermediate region; a supporting structure having a unitary member on which the two core strips are held mounted in their operative position, the unitary member of said supporting structure having outwardly projecting support surfaces receiving the pole-tip regions of the magnetic core portions and extending from one pair of the opposing pole portions to the other pair for rigidly holding the pole faces inflexibly in place and forming a stable support for the magnetic core loop, and means holding the core strips on the supporting structure.

7. A magnetic record transducing apparatus as defined by claim 1 in which the holding means include resilient elements pressing inwardly against the exteriors of the core portions and holding them against the supporting structure.

8. A magnetic record transducing apparatus as defined by claim 7 in which the core portions are bent from sheet material to provide relatively wide pole faces for contact by magnetic record members in the form of tapes.

9. A magnetic record transducing apparatus as defined by claim 8 in which the supporting structure is shaped to permit a small amount of inward flexing of the bent core portions under the urging of the resilient elements.

OTTO KORNEI.

REFERENCES CITED

The following references are of record in the file of this patent:

UNITED STATES PATENTS

| Number | Name | Date |
|---|---|---|
| 2,351,003 | Camras | June 13, 1944 |
| 2,351,007 | Camras | June 13, 1944 |

FOREIGN PATENTS

| Number | Country | Date |
|---|---|---|
| 617,796 | Germany | Aug. 28, 1935 |